(12) United States Patent
Yamada

(10) Patent No.: US 6,400,962 B1
(45) Date of Patent: Jun. 4, 2002

(54) MOBILE COMMUNICATION TERMINAL

(75) Inventor: Yoshiko Yamada, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/421,294

(22) Filed: Oct. 20, 1999

(30) Foreign Application Priority Data

Jul. 16, 1999 (WO) .................................. PCT/JP99/3831

(51) Int. Cl.$^7$ .............................. H04B 1/38; H04Q 7/20
(52) U.S. Cl. ...................... 455/552; 455/428; 455/553
(58) Field of Search ............................... 455/426, 427, 455/428, 430, 12.1, 512, 513, 552, 553, 566, 140, 143

(56) References Cited

U.S. PATENT DOCUMENTS

| | | | |
|---|---|---|---|
| 5,535,430 A | * 7/1996 | Aoki et al. ................... | 455/552 |
| 5,732,359 A | 3/1998 | Baranowski, II et al. | |
| 5,966,667 A | * 10/1999 | Halloran et al. ............. | 455/552 |
| 6,134,437 A | * 10/2000 | Karabinis et al. ........... | 455/427 |
| 6,233,463 B1 | * 5/2001 | Wiedeman et al. ......... | 455/522 |

FOREIGN PATENT DOCUMENTS

| | | | |
|---|---|---|---|
| EP | 0 505 341 A2 | | 9/1992 |
| JP | 6276144 | | 9/1994 |
| JP | 406260990 A | * | 9/1994 |
| JP | 8186876 | | 7/1996 |
| JP | 409121376 A | * | 5/1997 |
| JP | 10 108262 | | 4/1998 |
| JP | 10 191423 | | 7/1998 |
| JP | 11 187451 | | 7/1999 |
| JP | 2000232312 A | * | 8/2000 |
| WO | WO 96/28947 A1 | | 9/1996 |

OTHER PUBLICATIONS

Baranowsky II, P.W., "MSAT and Cellular Hybrid Networking", Proceedings of the International Mobile Satellite Conference, Jun. 16–18, 1993, pp. 149–154.

* cited by examiner

*Primary Examiner*—Nguyen T. Vo
*Assistant Examiner*—Charles N. Appiah
(74) *Attorney, Agent, or Firm*—Rothwell, Figg, Ernst & Manbeck

(57) ABSTRACT

A threshold value acting as a standard for switching a satellite communication mode and a cellular communication mode is adapted to use preset fixed threshold value. Thus the problem has arisen that a communication mode is switched in response to a signal level and a threshold value and not with reference to the requirements of a terminal user.

A menu screen allowing a terminal user to select a communication mode prioritizing use of a satellite communication mode or an earth-based communication mode is displayed. A communication mode input means and a threshold value variation means are provided. The communication mode input means receives input of a desired communication mode selected by a terminal user. The threshold value variation means varies a switching sensitivity of a communication mode with reference to a communication quality of a received signal by varying a threshold value in order to evaluate a communication quality of a received signal in response to a desired communication mode input from the communication mode input means.

5 Claims, 5 Drawing Sheets

(a)

(b)

MOBILE COMMUNICATION TERMINAL

BACKGROUND OF THE INVENTION

1. Field of the Invention

The present invention relates to a mobile communication terminal provided with the dual function of communicating by switching a communication mode between satellite communication and earth-based cellular communication systems.

2. Description of the Prior Art

A mobile communication system (hereafter unified communication system) which comprises a unified plurality of communication modes such as mobile satellite communication (hereafter satellite communication) and earth-based cellular communication (hereafter cellular communication) is comprised by an earth-based service area of small zones in which cellular communication is used and by satellite areas in which satellite communication is used.

In this type of unified communication system, a dual mode terminal (hereafter dual terminal) is used which enables selection of the communication modes of cellular communication or satellite communication. The dual terminal performs cellular communication when positioned in an earth-based service area. Switching of the communication mode is made on the border of an earth-based service area and satellite service area from cellular to satellite communication and thereafter satellite communication is performed in the earth-based service area.

The switching of the communication mode is performed by monitoring the reception levels of signal waves transmitted from base stations in the earth-based service area. FIG. 4 shows a mobile communication device mounted in a communication system as disclosed, for example, in JP-A-10-108262. FIG. 5 shows the relationship between reception level and a communication mode switching standard. In FIG. 4, reference numeral 7 is a radio zone, 8 is a mobile station which displaces in a radio zone, 9 is a base station, 10 is a communication satellite, 11 is a mobile station which displaces outside a radio zone 7. The mobile station 8 which displaces inside the radio zone 7 communicates with the radio base station 9. When the mobile station 8 displaces towards the periphery of the radio zone 7 (the direction of the arrow I), as shown in FIG. 5, the signal level from the base station 9 which is received by the mobile station 8 gradually reduces.

When the mobile station 8 detects a reduction in the signal level of the base station 9, measurement of the signal level of the signal transmitted from the communication satellite 10 is initiated. When the signal level transmitted from the base station 9 falls below a pre-set standard, the transmission quality between mobile station 8 and the base station 9 deteriorates and it becomes difficult to continue communication between the mobile station 8 and the base station 9. In this way, when the signal level from the base station 9 falls below a fixed standard, the mobile station 8 continues communication by switching communications to a communication satellite from the base station 9. Conversely, when a mobile station 11 which is positioned outside the radio zone 7 is displaced towards the radio zone 7 (the direction of the arrow II), the signal level from the base station 9 increases. When the level of the signal exceeds a fixed standard, the communication station switches communication from the communication satellite 10 to the base station 9.

However the threshold value which represents the determination standard for switching communication modes is fixed at a determined value. Thus switching of the communication mode is performed on the basis of the threshold value and the signal level entirely without reference to the requirements of a terminal user. In order to maintain a fixed communication quality, it is desirable that the threshold value is set to a high level and that the communication mode is switched with slight reductions in the received level. On the other hand, when the communication mode is switched frequently, the problem has arisen position registration traffic increases. Furthermore generally satellite communication is relatively more expensive than earth-based systems.

There is strong demand amongst terminal users for the use of cheap cellular communication as opposed to satellite communications. In order to suppress communication costs, the threshold value may be set to a low signal level which enables communication. However low threshold values may result in communication states becoming unstable and communication quality deteriorating. Since the requirements of terminal users with respect to communication costs and communication quality differ depending on respective use environments, a communication terminal device adapted to set a threshold value depending on the use conditions of an individual terminal user would have considerable advantages.

The present invention is proposed to solve the above problems and has a first object of providing a mobile communication terminal device which can set a plurality of communication mode switching threshold values and which can be used to select a desired communication mode switching threshold from a plurality of communication switching threshold values depending on a use condition. The present invention has a second object of providing a mobile communication terminal device which enables the setting of a communication mode switching threshold value in response to the personal requirements of a terminal user.

SUMMARY OF THE INVENTION

A mobile communication terminal device according to the present invention comprises a control means which evaluates a communication quality of a received signal by comparing a reception level of a signal transmitted by a satellite and a base station with a fixed threshold value and which switches selectively between a satellite communication mode which performs signal transmission and reception with a satellite and an earth communication mode which performs signal transmission and reception with a base station controlling a cell in a given region, a communication mode input means which displays a menu screen allowing selection of said communication modes by a user, said satellite communication mode and said earth communication mode being prioritized and used out of said communication modes, and said communication mode input means receiving input of a desired communication mode selected by a user, and a threshold value variation means which varies a switching sensitivity of a communication mode with respect to a communication quality of a received signal by varying a threshold value in order to evaluate a communication quality of a received signal in response to a desired communication mode input from said communication mode input means.

A mobile communication terminal device according to the present invention further comprises a threshold value storage means which stores a plurality of threshold values divided into communication modes. A suitable threshold value from among said plurality of threshold values is selected in response to a communication mode input through said communication mode input means and is output to said control means.

A mobile communication terminal device according to the present invention is further characterized in that said communication mode input means displays a communication mode selection screen. The communication selection screen displaying communication modes are selectable by a terminal user and said selectable communication modes are a satellite system priority mode mainly performing communication with a satellite and an earth system communication mode performing communication using a satellite as little as possible. Alternatively said communication mode input means displays a communication mode selection screen displaying a mode prioritizing a low call rate mode or a high quality communication mode prioritizing communication quality.

A mobile communication terminal device according to the present invention is further characterized in that, when a communication mode selected by a terminal user is a mode which prioritizes the use of a low call rate mode, said threshold value variation means determines that an earth system priority mode has been selected and varies a threshold value. When a communication mode is selected which prioritizes a high communication quality, said threshold value variation means determines that a satellite communication mode is selected and varies a threshold value.

A mobile communication terminal device according to the present invention is further characterized in that said control means evaluates a communication quality of a received signal by comparing a fixed threshold value with one of an average value for a received signal value in a unit time, a bit error rate of a received signal or an out-of-synch frequency.

DETAILED DESCRIPTION OF THE PREFERRED EMBODIMENTS

Embodiment 1

Figure 1:
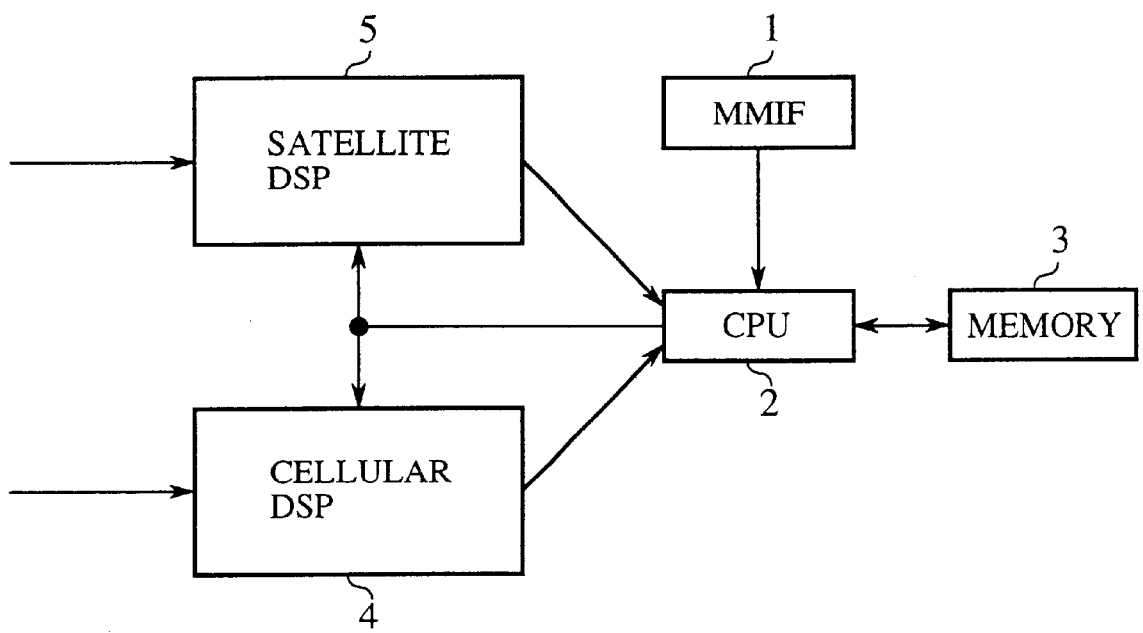
FIG. 1 is an explanatory view showing a mobile communication terminal device according to the present invention.

FIG. 1 is an explanatory view showing a mobile communication terminal device according to the present invention. In FIG. 1, reference numeral 1 denotes a user interface, 2 is a CPU (central processing unit), 3 is a threshold value memory, 4 is a DSP (cellular digital signal processor), and 5 is a satellite DSP. The user interface 1 comprises a communication mode input means which displays a menu screen allowing selection of communication modes and which receives input of selected communication modes.

The CPU 2 performs the function of a threshold value variation means which varies a threshold value in response to a communication means and the function of a control means which evaluates a communication quality of a received signal by comparison of a threshold value with a reception value and which switches a communication mode. The threshold value memory 3 is a threshold value storage means which stores a threshold value used in the evaluation of communication quality of received signals.

Figure 2:
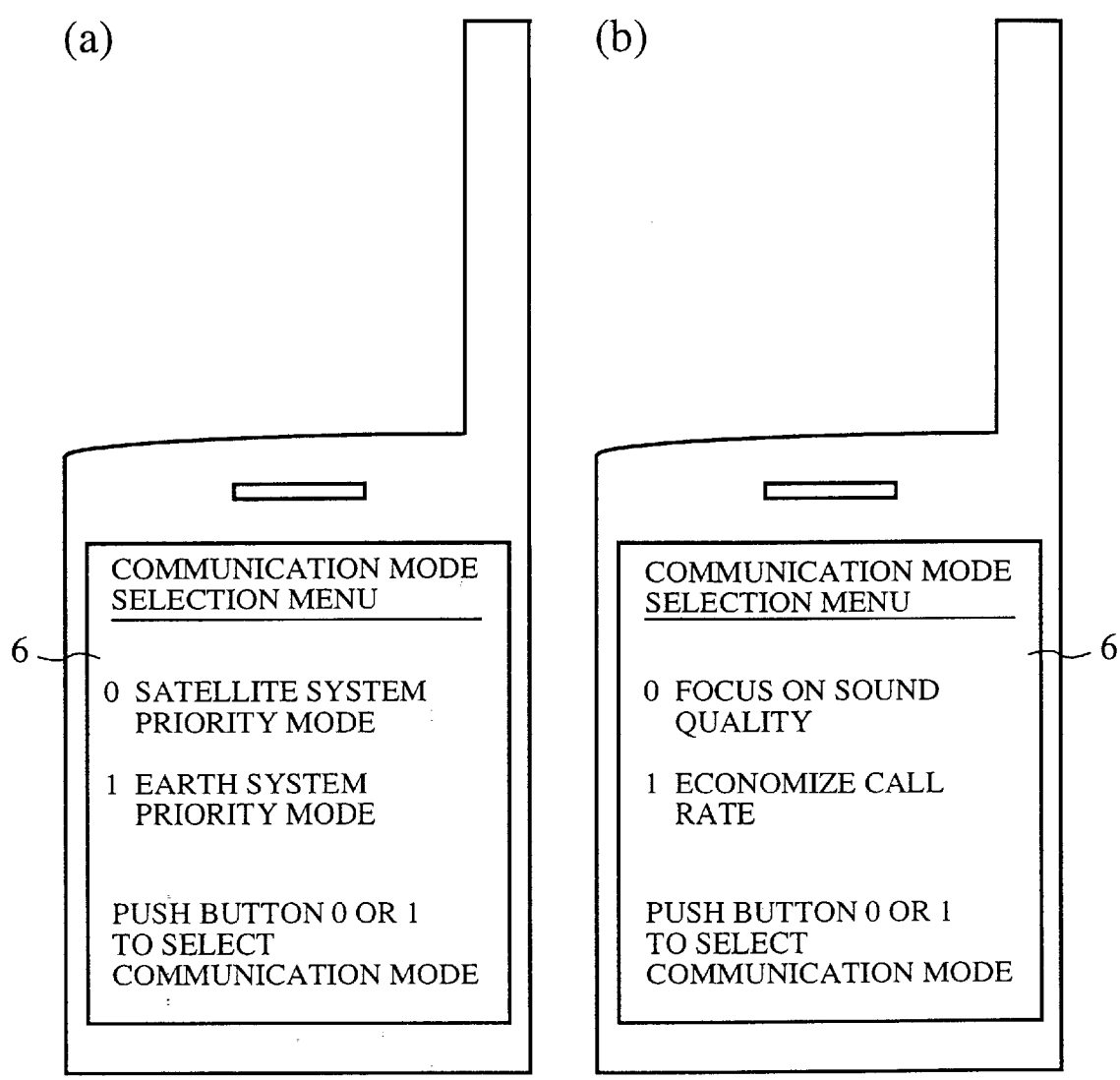
FIG. 2 shows a section of the mobile communication terminal device displaying a communication mode selection menu.

FIG. 2 shows a user interface 1. The display screen 6 shown in FIG. 2 is shown in a state of displaying a communication mode selection menu. A user inputs a selected communication mode in accordance with the communication mode selection menu. The communication mode selection menu shown in FIG. 2(a) provides the two options of "(satellite system priority mode) which prioritizes satellite communication " and "(earth system priority mode) which prioritizes cellular communication ".

When a display message of the communication mode selection menu is varied to the message "focus on sound quality " or "economize call rate " as shown in FIG. 2(b), it is possible for a terminal user to easily understand the selection of the communication modes. When a terminal user selects the mode "focus on sound quality ", satellite-based prioritizing mode is selected in order to maintain fixed communication quality. On the other hand, when a terminal user selects the mode "economize communication rate ", earth-based prioritizing mode is selected.

Figure 3:
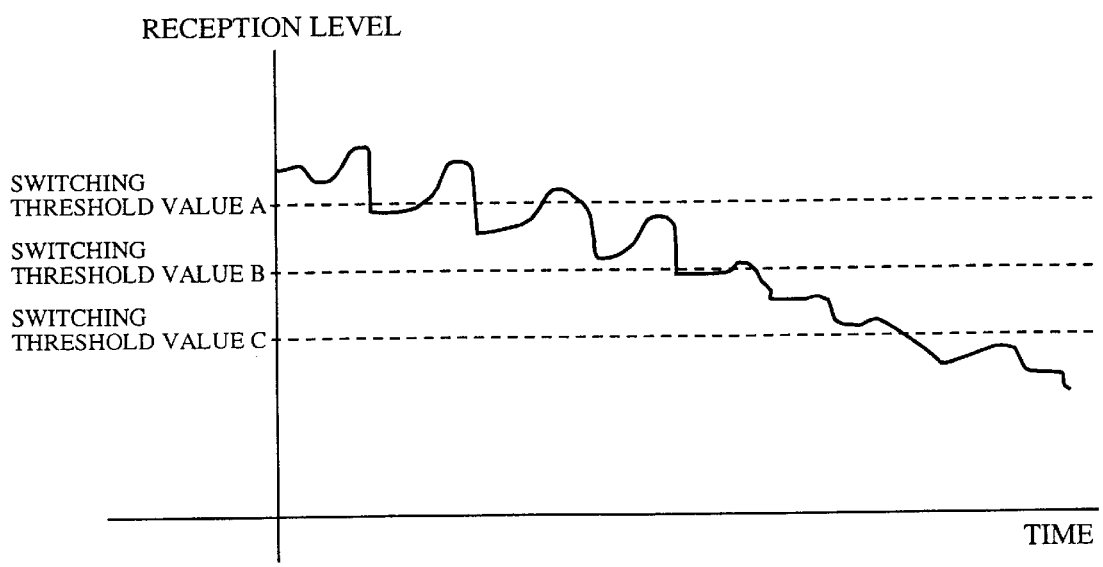
FIG. 3 shows the relationship between a threshold value and a signal level of a mobile communication terminal device which communicates with a radio base station.
Figure 3:
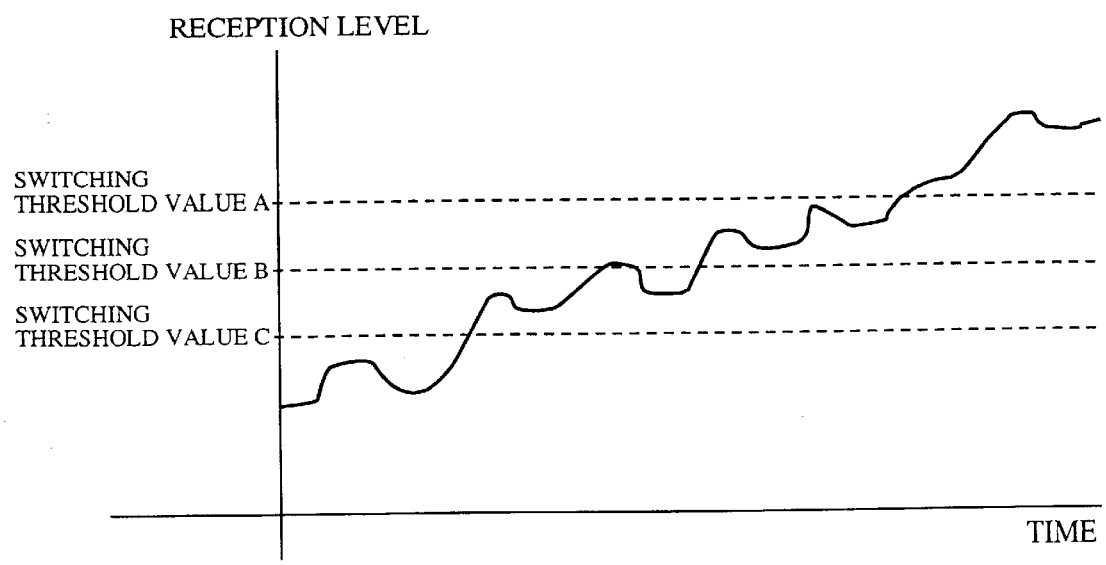

FIG. 3 shows the relationship between a threshold value and a signal level of a mobile communication terminal device. FIGS. 3(a) and (b) plot received signal level on the vertical axis against time on the horizontal axis. FIG. 3(a) shows a gradual reduction in the received signal level from a base station when a mobile station in a fixed radio cell displaces towards a radio cell periphery while performing cellular communication. FIG. 3(b) shows a gradual increase in the received signal level from an earth-based station when a mobile station disposed outside a radio cell displaces towards a radio cell periphery while performing satellite communication.

That is to say, FIG. 3(a) shows the timing of switching communication mode to satellite communication from cellular communication. FIG. 3(b) shows the timing of switching communication mode to cellular communication from satellite communication. In other words, as shown in FIG. 3(a), the signal level reduces with displacement towards the radio cell periphery. On the other hand, the time at which mode is switched from cellular communication to satellite communication is retarded to the degree that a standard (switching threshold value) is set to descending levels of A, B, C. In such a way, it is possible to control the timing of communication mode switching by variation of the switching threshold value.

FIGS. 3(a) and (b) show three threshold switching values A, B and C. Which of the switching threshold values A, B and C is used depends on the communication mode selected by the terminal user. Switching threshold value A is the highest reception level, switching threshold value C is the lowest reception level and are set so as to switch communication modes. When a communication mode is not indicated by the terminal user, the switching value B is used as a communication mode switching threshold value.

The operation of a mobile communication terminal will be described on the basis of the above description. The terminal user selects a desired communication mode according to a communication mode selection menu displayed on the display screen 6 (the user interface 1 shown in FIG. 1). For example, when the terminal user selects (satellite priority mode), the button (0) is depressed as indicated on the communication mode selection menu. Thus the communication mode selected by the terminal user is transmitted to the CPU 2 through the interface 1 shown in FIG. 1.

The threshold value storage section 3 stores a selected communication mode and a correlated switching threshold value adapted to that communication mode. For example, satellite priority mode is stored with switching threshold value A and earth priority mode is stored with switching threshold value C. The CPU 2 reads a threshold value which is adapted to a communication mode selected by a user from the threshold storage section 3 and varies the switching threshold value used in communication quality evaluation. The communication quality of the received signal is evaluated by comparing the received level in which the switching threshold value and the cellular DSP 4 are calculated. The received level in which the cellular DSP 4 is calculated is stored in the memory and the communication quality is evaluated by comparing the switching threshold value and an average value of a temporary received level.

Figure 4:
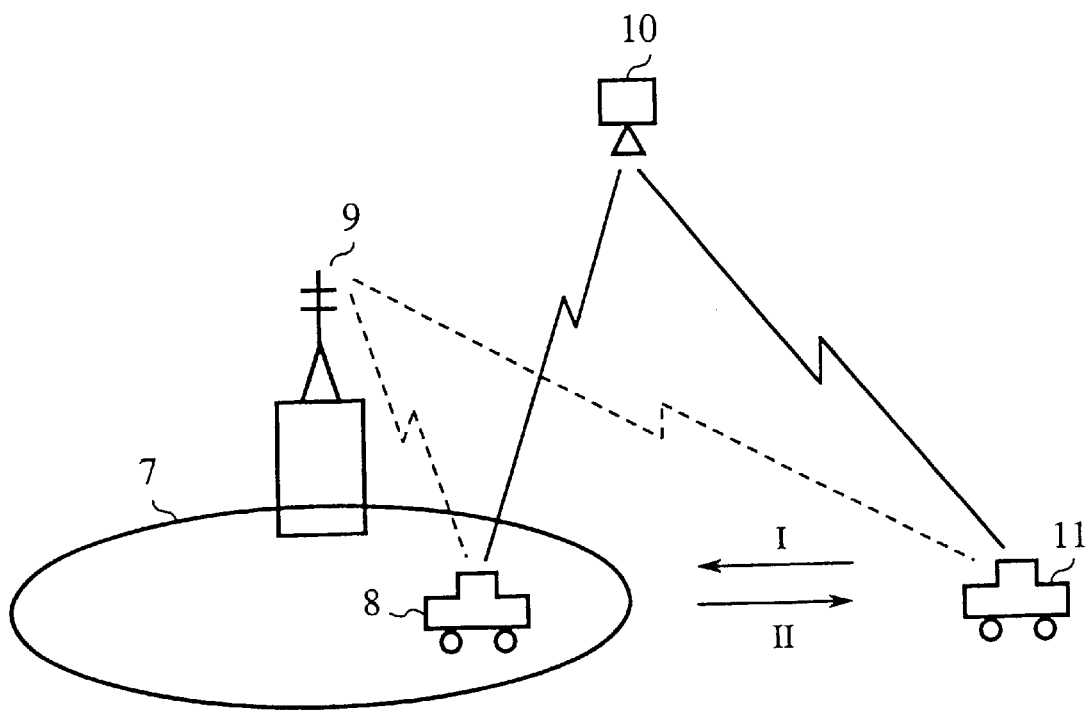
FIG. 4 is a schematic view of a communication system mounting a conventional mobile communication terminal device.
Figure 5:
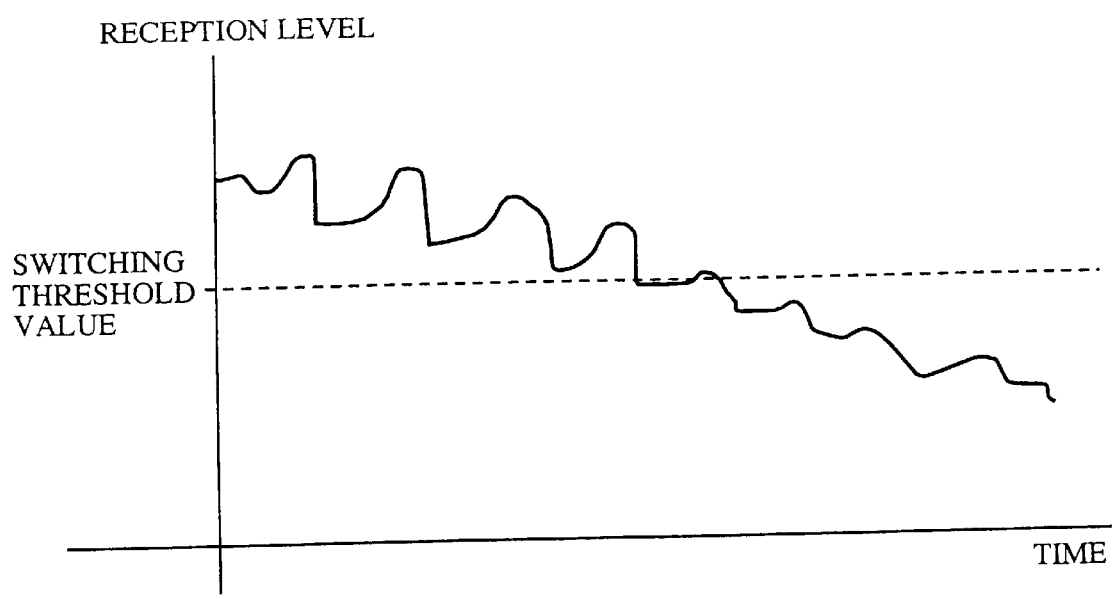
FIG. 5 shows the relationship between a threshold value and a signal level of a mobile communication terminal device which communicates with a radio base station.

As shown in FIG. 4, a mobile station when in a radio cell 7 adopts a cellular communication mode which performs communication with a base station 9. As shown in FIG. 3(a), when the mobile communication terminal device 8 displaces in a peripheral direction (direction I) from the radio cell 7, the received level is gradually reduced. If the communication mode selected by the terminal user is (satellite priority mode), the switching threshold value A and the reception level are compared. When (earth system priority mode) is selected, the switching threshold value C and the reception level are compared.

In this way, the CPU 2 evaluates communication quality by comparing a reception level and a switching threshold value until the reception level is less than the level of the switching threshold value. When the reception level from the base station is less than the level of the switching threshold value, it is determined that the communication quality is below a level at which earth-based communication can be maintained. Thus a switching signal is output to the cellular DSP 4 and the satellite DSP 5. When these switching signals are received, communication processing is handed over to the satellite DSP 5 by the cellular DSP 4 and switching of the communication mode is completed.

A mobile station 11 which is placed outside of a radio cell 7 adopts a satellite communication mode which performs communication with a satellite 10. When the mobile communication terminal device 8 displaces in the direction of a radio cell (direction II) from outside the radio zone 7, the reception level as shown in FIG. 3(b) gradually increases. If the communication mode selected by the terminal user is (satellite system priority mode), the switching threshold value A and the reception level of the signal transmitted from the base station are compared. When (earth system priority mode) is selected, the switching threshold value C and the reception level are compared.

In this way, the CPU 2 evaluates communication quality by comparing a reception level and a switching threshold value until the reception level is greater than the level of a switching threshold value. When the reception level from the base station is greater than the level of the switching threshold value, the CPU 2 determines that the communication quality of the base station has reached a level at which communication is possible. Thus a switching signal is output to the cellular DSP 4 and the satellite DSP 5. When these switching signals are received, communication processing is handed over to the cellular DSP 4 by the satellite DSP 5 and switching of the communication mode is completed.

The above description has described a mobile station which evaluates a communication quality of a received signal and switches a communication mode by comparing a reception level of a signal from a base station with a switching threshold signal. However a reception level is merely one parameter of displaying a communication quality of a received signal. Switching of communication mode by parameters other than reception level will be described below.

For example, a bit error ratio of the received signal may be taken as a parameter of evaluating the communication quality of a received signal. In such a case, the communication quality of the received signal is evaluated by comparing the bit error ratio transmitted to the CPU 2 by the cellular DSP 4 with a fixed threshold value.

Furthermore an out-of-synch ratio of the received signal may be taken as a parameter of evaluating the communication quality of the received signal. In such a case, the CPU 2 stores cellular received synchronization information in a memory and evaluates communication quality by comparing a fixed out-of-synch ratio with a threshold value.

As shown above, a mobile communication terminal according to the present invention performs communication mode switching by using a switching threshold value which is adapted to a communication mode selected by a user. The switching threshold values vary the timing of switching the respective communication modes. Thus an optimal threshold value may be set by the user themselves with respect to a use environment of the terminal user.

What is claimed is:

1. A mobile communication terminal device comprising
a control means which evaluates a communication quality of a received signal by comparing a reception level of a signal transmitted by a satellite and a base station with a fixed threshold value and which switches selectively between a satellite communication mode which performs signal transmission and reception with a satellite and an earth communication mode which performs signal transmission and reception with a base station controlling a cell in a given region,
a communication mode input means which displays a menu screen as allowing selection of said communication modes by a user, said satellite communication mode and said earth communication mode being prioritized and used out of said communication modes, and said communication mode input means receiving input of a desired communication mode selected by a user, and
a threshold value variation means which varies a switching sensitivity of a communication mode with respect to a communication quality of a received signal by varying a threshold value in order to evaluate a communication quality of a received signal in response to a desired communication mode input from said communication mode input means.

2. A mobile communication terminal device according to claim 1 wherein said threshold value variation means comprises a threshold value storage means which stores a plurality of threshold values divided into communication modes, a suitable threshold value from among said plurality of threshold values being selected in response to a communication mode input through said communication mode input means and output to said control means.

3. A mobile communication terminal device according to claim 1 wherein said communication mode input means displays a communication mode selection screen, said communication selection screen displaying communication modes selectable by a terminal user, said selectable communication modes being a satellite system priority mode mainly performing communication with a satellite and an earth system communication mode performing communication using a satellite as little as possible, alternatively said communication mode input means displays a communication mode selection screen displaying a mode prioritizing a low call rate mode or a high quality communication mode prioritizing communication quality.

4. A mobile communication terminal device according to claim 3 wherein when a communication mode selected by a terminal user is a mode which prioritizes the use of a low call rate mode, said threshold value variation means determines that an earth system priority mode has been selected and varies a threshold value and when a communication mode is selected which prioritizes a high communication quality, said threshold value variation means determines that a satellite communication mode is selected and varies a threshold value.

5. A mobile communication terminal device according to claim 1 wherein said control means evaluates a communication quality of a received signal by comparing a fixed threshold value with one of an average value for a received signal value in a unit time, a bit error rate of a received signal or an out-of-synch frequency.

* * * * *